United States Patent
Stangl

(10) Patent No.: US 9,039,317 B2
(45) Date of Patent: May 26, 2015

(54) CONNECTING ARRANGEMENT BETWEEN A PLASTIC COMPONENT AND ANOTHER STRUCTURAL ELEMENT

(71) Applicant: Bayerische Motoren Werke Aktiengesellschaft, Munich (DE)

(72) Inventor: Matthias Stangl, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/255,498

(22) Filed: Apr. 17, 2014

(65) Prior Publication Data

US 2014/0227058 A1    Aug. 14, 2014

Related U.S. Application Data

(63) Continuation of application No. PCT/EP2012/067172, filed on Sep. 4, 2012.

(30) Foreign Application Priority Data

Nov. 17, 2011 (DE) .......................... 10 2011 086 543

(51) Int. Cl.
   *F16B 39/22* (2006.01)
   *F16B 11/00* (2006.01)

(52) U.S. Cl.
   CPC .............. *F16B 39/225* (2013.01); *F16B 11/006* (2013.01)

(58) Field of Classification Search
   CPC ....... F16B 39/225; F16B 39/22; F16B 11/006
   USPC ........... 411/82, 82.2; 403/276, 281, 282, 283, 403/285
   See application file for complete search history.

(56) References Cited

U.S. PATENT DOCUMENTS

| | | | |
|---|---|---|---|
| 2,607,447 A | 8/1952 | Tuttle | |
| 3,451,181 A | 6/1969 | Neuschotz | |

(Continued)

FOREIGN PATENT DOCUMENTS

| | | |
|---|---|---|
| DE | 1 198 038 A | 8/1965 |
| DE | 103 05 015 A1 | 9/2004 |

(Continued)

OTHER PUBLICATIONS

English-language machine translation of DE 10 2011 009 334 A1, Patent Translate, European Patent Office, 18 pages (including specification and claims).*

(Continued)

*Primary Examiner* — Gay Ann Spahn
(74) *Attorney, Agent, or Firm* — Crowell & Moring LLP

(57) ABSTRACT

A connecting arrangement is provided between a plastic component with at least two mutually adjacent and at least approximately parallel walls and another structural element, having at least one force-transmission element which is adhesively bonded to the plastic component via an adhesive bond on the plastic component in frusto-conical or spherical-segment-shaped depressions in the mutually adjacent walls of the plastic component. The force-transmission element has a carrying structure for the other structural element. With the exception of a possibly provided coating, the force-transmission element is composed only of metallic material and has a plate which is adapted to the depression in the outer wall of the plastic component, which outer wall is adjacent to the other structural element. The edge of the plate rests with interposition on the outer wall in the surrounding region of the depression, wherein the plate is connected via a web to an end section of the force-transmission element, which end section is adapted to the depression in the other inner wall of the plastic component. The depression is configured in the outer wall without a bottom to such an extent that the end section of the force-transmission element can be inserted through the outer wall into the recess of the inner wall.

6 Claims, 1 Drawing Sheet

(56) References Cited

U.S. PATENT DOCUMENTS

| | | | |
|---|---|---|---|
| 4,006,362 A * | 2/1977 | Mollon et al. | 376/272 |
| 4,729,705 A * | 3/1988 | Higgins | 411/82 |
| 4,812,193 A * | 3/1989 | Gauron | 156/293 |
| 5,536,344 A * | 7/1996 | van Dreumel | 156/73.5 |
| 8,628,286 B2 * | 1/2014 | Duvekot et al. | 411/369 |
| 2002/0050105 A1 | 5/2002 | McCorkle et al. | |
| 2003/0116282 A1 * | 6/2003 | Hutter, III | 156/380.2 |
| 2008/0179913 A1 * | 7/2008 | Coon et al. | 296/146.11 |
| 2011/0204195 A1 * | 8/2011 | Stanley | 156/92 |

FOREIGN PATENT DOCUMENTS

| | | |
|---|---|---|
| DE | 10 2011 009 334 A1 | 8/2011 |
| DE | 10 2010 054 094 B3 | 5/2012 |
| EP | 1 300 596 A1 | 4/2003 |
| WO | WO 2005/045263 A1 | 5/2005 |
| WO | WO 2010/001738 A1 | 1/2010 |

OTHER PUBLICATIONS

International Search Report (PCT/ISA/210) with English translation dated Jan. 15, 2013 (Six (6) pages).

German Search Report with English translation dated Aug. 9, 2012 (Ten (10) pages).

Schievenbusch, F: "Beitrag zu Hochbelasteten Krafteinleitungselementen für Faserverbundbauteile", Von der Fakultät für Maschinenbau und Verfahrenstechnik der Technischen Universität Chemnitz, Dissertation, Feb. 6, 2003, (One hundred and thirty-nine (139) pages).

\* cited by examiner

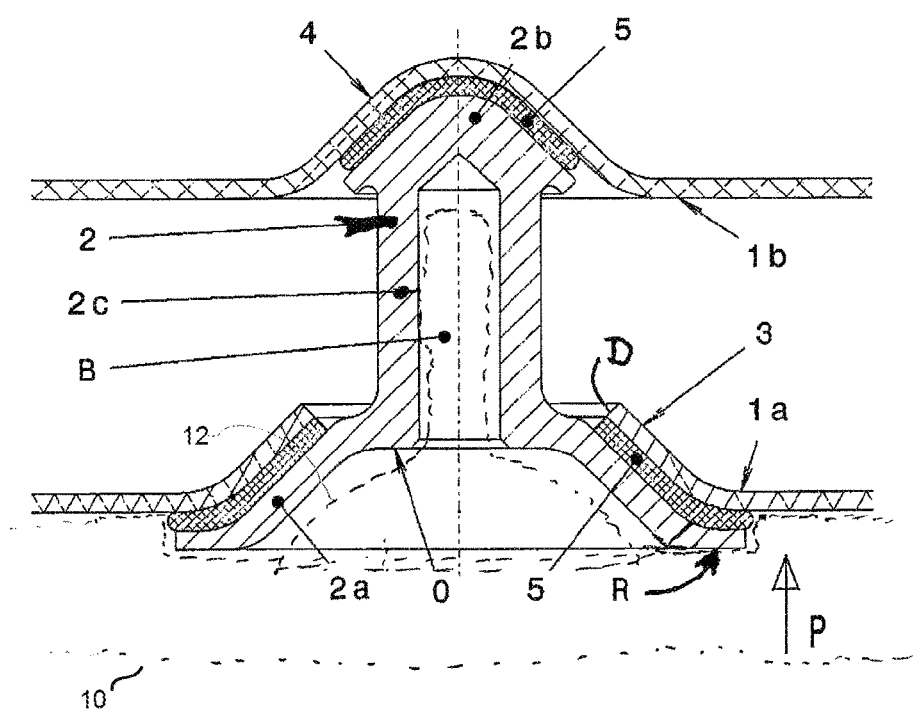

CONNECTING ARRANGEMENT BETWEEN A PLASTIC COMPONENT AND ANOTHER STRUCTURAL ELEMENT

CROSS REFERENCE TO RELATED APPLICATIONS

This application is a continuation of PCT International Application No. PCT/EP2012/067172, filed Sep. 4, 2012, which claims priority under 35 U.S.C. §119 from German Patent Application No. 10 2011 086 543.8, filed Nov. 17, 2011, the entire disclosures of which are herein expressly incorporated by reference.

BACKGROUND AND SUMMARY OF THE INVENTION

The invention relates to a connecting arrangement between a plastic component with at least two mutually adjacent and at least approximately parallel walls, and another structural element, having at least one force transmission element in frusto-conical (truncated cone) or spherical segment-shaped depressions in the mutually adjacent walls of the plastic component. The force transmission element has or forms a support structure for the other structural element. DE 103 05 015 A1 is hereby cited as prior art.

In the field of vehicle construction, as part of efforts to achieve lightweight construction, both larger structural body components and even entire vehicle bodies are made of fiber-reinforced plastic. However, in vehicles—for example passenger vehicles with plastic bodies—there are also components which are attached to the plastic vehicle structure, and which transmit relatively large forces and/or torques into this structure and/or into the structural component. From DE 103 05 015 A1 named above, a force transmission device is known for a plastic structural component, which is optimized for favorable force transmission, wherein this structural component can also be designed with two walls—meaning having two walls which are at least approximately parallel to each other—and wherein the force transmission device is supported on the two walls of the structural component, in depressions, and is glued to the same for this purpose. This known force transmission device is designed with a hybrid construction, and is therefore relatively complex. Furthermore, in this prior art, the arrangement and/or assembly of the force transmission device on the two walls of the plastic structural component is also relatively difficult.

There is therefore needed a force transmission device for a plastic component, having at least two mutually adjacent and approximately parallel walls, and/or for a connection arrangement between such a plastic component and another structural element, particularly for the field of vehicle construction, the same having a relatively simple design and being particularly simple to install.

This need is met by providing a connection arrangement wherein the force transmission element is composed only of a metal material with the exception of an optionally added coating, and has a disk or plate matched to the frusto-conical or spherical segment-shaped depression in an outer wall of the plastic component which is adjacent to the other structural element, and therefore seated against the outer wall of the plastic component, in this depression, with an adhesive layer between the same. The edge of the disk or plate lies on the outer wall in the proximity of the depression with adhesive between the same. The disk or plate is connected to an end section of the force transmission element via a web. The end section is matched to the frusto-conical or spherical segment-shaped depression in the other inner wall of the plastic component with an adhesive layer between the same. The depression in the outer wall is constructed, in any case, without a floor, such that the end section of the force transmission element can be inserted through the outer wall into the depression in the inner wall. A support structure is molded onto the disk or plate and/or into the web of the force transmission element.

First, a force transmission element and/or a connection element which is simple to produce, and simultaneously sufficiently solid, is created by the same consisting essentially of only a metal material and/or being molded from such a material. However, it can optionally be necessary to coat the surface of the metallic force transmission element to prevent corrosion—meaning to cover the same with a suitable protective layer. However, this changes nothing in the metallic material of the force transmission element, which is therefore not constructed of a combination of a metal and non-metal.

Adhesive connections between this metallic material, and/or the surface coating of the force transmission element, and the fiber-reinforced plastic material of the plastic component, are likewise easy to produce, and as such are able to hold sufficiently securely, due to the two connection regions, the same having a truncated cone shape, by way of example, in the depressions of the two adjacent walls of the plastic component, wherein the same can be formed from right-angle circular cones. If, however, frusto-conical shaped connecting regions are formed from cones having elliptical base areas, or inclined cones, then it is possible to achieve a further increased resistance to rotation of the force transmission element relative to the plastic component. In cases where such increased rotation protection is not required, a spherical segment-shaped connection region can be included between a spherical segment-shaped depression and an accordingly adapted section, the same molded as a spherical segment, or a disk, of the force transmission element, instead of the frusto-conical shaped connection region, wherein such a spherical segment shape can be produced relatively easily. In this context, a further advantage is hereby named, namely a significant enlargement of the adhesion surface—meaning the surface over which the layer of adhesive can act—said enlargement resulting from the frusto-conical shape or the spherical segment shape of the connection region between the force transmission element and the plastic component, and/or the depressions molded into the walls thereof.

Because the disk or plate of the force transmission element, which is positioned in a frusto-conical or spherical segment-shaped depression of the outer wall which is adjacent to the structural element being fastened, is additionally seated on this outer wall in the region of the depression, via the edge region of said force transmission element, the force transmission element is also stably supported on the plastic component and/or at least on the outer wall thereof, for the transmission and/or receipt of torques. In this case, a force transmission element according to the invention can be easily inserted into a corresponding plastic component having at least two walls which are adjacent to each other and at least approximately parallel to each other, by the end section thereof, which is functionally assigned to the depression in the inner wall, being able to be inserted through the outer wall, which has a corresponding passage in the depression for the force transmission element and/or the disk or plate thereof, into the depression of the inner wall, with a layer of glue in-between.

As far as the support structure for the other structural element which is attached to the plastic component and/or supported on the same is concerned, it can either be formed by the disk or plate of the force transmission element itself, or a fastening element can be molded onto this disk or plate, and/or the web of the force transmission element named above can be molded as the fastening element—for example by the same having a hollow construction and being configured with a thread for the purpose of accommodating a fastening screw. Of course, the disk or plate and the end section of the force transmission element can also be connected to each other by multiple webs or the like.

Other objects, advantages and novel features of the present invention will become apparent from the following detailed description of one or more preferred embodiments when considered in conjunction with the accompanying drawings.

BRIEF DESCRIPTION OF THE DRAWING

The FIGURE is a cross-sectional illustration of an exemplary connecting arrangement according to the invention.

DETAILED DESCRIPTION OF THE DRAWING

Referring to the connecting arrangement shown in the Figure, the outer wall of a plastic component 1 is indicated with the reference number 1a, and the inner wall of the plastic component 1 is indicated by the reference number 1b. The plastic component 1 in this case is made of two walls and is not otherwise illustrated in further detail. The plastic component can be a structural body component of a vehicle (a passenger motor vehicle) molded from fiber-reinforced plastic such as from carbon-fiber reinforced plastic. A force transmission element 2 is attached by use of an adhesive to the plastic component 1, wherein another structural element 10 (shown schematically in broken lines) can be attached to the plastic component 1 via a so-called support structure of the force transmission element 2. Thus, the other structural element is fixed to the plastic component 1, while ensuring a good transmission of force via the force transmission element 2. This other structural element can be a subframe of the motor vehicle, by way of example, wherein control arms are connected to the same and bear wheels. Of course, the subframe and/or the other structural element in general, and the structural body component and/or the plastic component 1, can be connected to each other via a plurality of such force transmission elements 2.

For the purpose of receiving a force transmission element 2, a depression 3 (in the outer wall 1a) and/or a depression 4 (in the inner wall 1b) is included and/or molded into each wall 1a,1b. The wall of the plastic component 1 which is adjacent to the other structured element discussed above (said other structural element being attached to the plastic component 1 via the force transmission element 2) is indicated as the outer wall 1a. The inner wall 1b of the plastic component 1 is then situated on the side of the outer wall 1a which is opposite the other structural element. Each of the depressions 3, 4 has a frusto-conical (truncated-cone) shape in the present case, and in the present embodiment proceeds from a right-angle circular cone, and therefore has a rotationally symmetric design. The force transmission element 2 is glued to the plastic component 1 in these depressions 3, 4, wherein each adhesive layer is indicated by the reference number 5.

The force transmission element 2, which is composed only of a metallic material with the possible exception of an optionally included surface coating, has an end section 2b which is matched to the depression 4 in the inner wall 1b. The end section 2b is glued into this depression 4 with a precise fit (see the adhesive layer 5). The end section 2b in this case, which therefore also has a truncated cone shape, is connected via a web 2c to a disk (or plate) 2a of the force transmission element 2. The disk 2a is matched to the depression 3 in the outer wall 1a. The disk 2a is glued onto the outer wall 1a, in the depression 3, by way of an adhesive layer 5. The disk 2a is shaped in such a manner that it seats against the wall of the truncated cone-shaped depression 3, and therefore likewise has the shape of a truncated cone, at least on the side thereof which faces the outer wall 1a. In the embodiment shown, the disk 2a is practically entirely matched to the shape of the depression 3, as a result of the fact that not only does the side of the disk 2a which faces the wall 1a follow the shape of the depression 3, but also the side of the disk 2a which is opposite the outer wall 1a has the same such shape. However, the latter is not a necessary feature. In contrast, what is important is that the edge region R of the disk 2a is glued onto the outer wall 1a in an exterior region of the depression 4—meaning outside of the same—and in the present case surrounds the same as a circle—(see the adhesive layer 5). Opposite this flat surrounding region of the outer wall 1, the conical wall of the depression 4 also runs in the present embodiment with an incline at an angle on an order of magnitude of 45°, in order to prevent shear-force loading of the adhesive layer 5 during the joining of the adhesive connection.

The force transmission element 2 can be inserted into the plastic component 1 from the outside in the arrow direction P, after a layer of adhesive 5 has been applied in the depressions 3, 4 and on the outer wall 1, in the surrounding region of the depressions 3 at this position. As a result of the fact that a sufficiently large passage D is included in the base of the depression 3 of the outer wall, the end section 2b of the force transmission element 2, with the web 2c, can be guided through this passage D from the outside, and therefore through the outer wall 1a and into the depression 4 in the inner wall 1b. In this case, it is particularly advantageous that it is possible to compensate for lesser tolerance deviations in the individual component dimensions, as well as position tolerance, by way of the adhesive layer 5 which has a certain thickness and which can deform plastically during the joining.

As far as the support structure included on the force transmission element 2 for the other structural element (for example, a subframe) is concerned (the same being connected via this force transmission element 2 to the plastic component 1), the support structure is formed in this case by the web 2c, among other things, wherein the disk 2a functions as the support structure at the same time. In particular, as illustrated, a bore hole B is created in the web 2c, and a thread is created in the bore hole B, the same extending in the longitudinal direction of the web 2c, such that it is possible to screw-in and/or insert in general a fastening screw 12 (shown in broken lines) (and a fastening element in general) into this web 2c. The web 2c is therefore hollow. A lug or another suitably designed segment of the other structural element 10 can be clamped between the head of this fastening screw and the surface O of the disk 2a which surrounds the entrance opening of the bore hole in the web 2c.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting arrangement between a plastic component and a structural element, the connecting arrangement comprising:

at least two mutually adjacent and at least approximately parallel walls of the plastic component, an outer wall of the plastic component being adjacent to the structural element when connected, wherein the mutually adjacent walls include frusto-conical or spherical-segment shaped depressions protruding out of a plane of their respective walls;

at least one force transmission element composed only of a metal material, the force transmission element having a support structure for the structural element and being configured at a first end to have a disc adapted in shape to fit into the depression in the outer wall of the plastic component, wherein an edge of the disc extends over the outer wall in a region outside of and adjacent the depression with an adhesive interposed between the disc and the outer wall, a second end of the force transmission element connects with the disc via a web, the second end being adapted in shape to fit into the depression in an inner wall of the plastic component, the depression in the outer wall having an open bottom such that the second end of the force transmission element is insertable through the outer wall into the depression of the inner wall.

2. The connecting arrangement according to claim 1, wherein the support structure for the structural element is formed by the web having a hollow interior adapted to receive a fastening element.

3. The connecting arrangement according to claim 2, wherein a side of the disk facing away from the outer wall has a frusto-conical or spherical segment-shape.

4. The connecting arrangement according to claim 1, wherein the metal material of the force transmission element is provided with a coating.

5. The connecting arrangement according to claim 1, wherein the plastic component comprises a plastic vehicle body structural component.

6. The connecting arrangement according to claim 5, wherein the mutually adjacent and approximately parallel walls of the plastic vehicle body structural component are spaced apart from one another, the area between the mutually adjacent parallel walls containing only the metal material force transmission elements.

* * * * *